US009776881B2

(12) United States Patent
Vidal et al.

(10) Patent No.: US 9,776,881 B2
(45) Date of Patent: Oct. 3, 2017

(54) PROCESSES FOR MAKING SALT SYSTEMS INCLUDING BERYLLIUM FLUORIDE

(71) Applicant: Materion Corporation, Mayfield Heights, OH (US)

(72) Inventors: Edgar E. Vidal, Golden, CO (US); Christopher K. Dorn, Cleveland, OH (US)

(73) Assignee: MATERION CORPORATION, Mayfield Heights, OH (US)

( * ) Notice: Subject to any disclaimer, the term of this patent is extended or adjusted under 35 U.S.C. 154(b) by 150 days.

(21) Appl. No.: 14/836,241

(22) Filed: Aug. 26, 2015

(65) Prior Publication Data
US 2016/0083261 A1    Mar. 24, 2016

Related U.S. Application Data

(60) Provisional application No. 62/052,589, filed on Sep. 19, 2014.

(51) Int. Cl.
*C01F 3/00* (2006.01)

(52) U.S. Cl.
CPC ............. *C01F 3/005* (2013.01); *Y02P 20/134* (2015.11)

(58) Field of Classification Search
CPC ........................................ C01F 3/005
USPC .......................................... 423/464
See application file for complete search history.

(56) References Cited

U.S. PATENT DOCUMENTS

| 2,532,102 A * | 11/1950 | Kawecki | ................ C01F 3/005 423/114 |
| 2,819,149 A * | 1/1958 | Schwenzfeier, Jr. | ... C01F 3/005 422/606 |
| 2013/0167832 A1* | 7/2013 | Kim | .......................... F24J 2/38 126/600 |

FOREIGN PATENT DOCUMENTS

CN        103 606 385 A     2/2014

OTHER PUBLICATIONS

Anderl et al.; Flibe Molten Salt Research for Tritium Breeder Applications; JAERI Conf.; pp. 265-274; 2004.
International Search Report and Written Opinion of International Application No. PCT/US2015/046925 dated Oct. 30, 2015.

* cited by examiner

*Primary Examiner* — Ngoc-Yen Nguyen
(74) *Attorney, Agent, or Firm* — Richard M. Klein; Fay Sharpe LLP

(57) ABSTRACT

Processes for producing beryllium fluoride salt systems containing beryllium fluoride, such as lithium beryllium fluoride salts, are disclosed herein. The processes include mixing ammonium beryllium fluoride with a lithium compound, melting the mixture to form a molten phase, purging the molten phase, and cooling the molten phase. This reduces the number of manufacturing steps needed to obtain the beryllium fluoride containing salt.

12 Claims, 3 Drawing Sheets

PROCESSES FOR MAKING SALT SYSTEMS INCLUDING BERYLLIUM FLUORIDE

CROSS-REFERENCE TO RELATED APPLICATIONS

This application claims priority to U.S. Provisional Patent Application Ser. No. 62/052,589, filed Sep. 19, 2014, the entirety of which are fully incorporated by reference.

BACKGROUND

The present disclosure relates to processes for manufacturing salt systems containing beryllium fluoride.

Current designs of nuclear fusion and fusion/fission reactors have considered the use of liquid lithium beryllium fluoride (FLiBe) as a cooling medium for various parts of the reactor. FLiBe can also be used to breed tritium, which can be harvested in fusion reactions to make new fusion targets.

FLiBe is a salt of lithium fluoride and beryllium fluoride of varying ratios. This lithium beryllium fluoride has been used extensively in its liquid state as a heat exchange fluid in applications such as solar energy storage, molten salt fission reactors, and fusion reactors, as well as in the electrochemical production of beryllium metal. The low melting point of beryllium fluoride and the fact that its combination with lithium fluoride produces a eutectic with a low melting point is very suitable for such applications. For molten salt reactors, the optimum molten salt is one with a low vapor pressure, low melting point, and high heat capacity, and FLiBe provides all of these characteristics. FLiBe is also being considered for use in fission reactors that use thorium as a fuel.

The traditional method of producing lithium beryllium fluoride has been through the direct co-melting of lithium fluoride and beryllium fluoride in a controlled atmosphere, as shown in Reaction (1):

$$2LiF + BeF_2 \rightarrow Li_2BeF_4 \quad (1)$$

This reaction is slightly exothermic ($\Delta H$ at 1000° C.=−2.59 kcal/mol), but the free energy ($\Delta G$ at 1000° C.=−11.7 kcal/mol) is also slightly negative. The log K value for this reaction is 2.01, which is very low and indicates that the reaction does not proceed completely to form FLiBe.

It would be desirable to provide processes for obtaining lithium beryllium fluoride salts that can be simpler and/or result in greater conversion of reactants to product.

BRIEF DESCRIPTION

The present disclosure relates to processes for forming salt systems containing beryllium fluoride. Generally, ammonium beryllium fluoride is used as a reactant with other compounds. The compounds are mixed to form a reaction mixture that is then melted together. The molten phase is purged to remove residual gases and other byproducts. The molten phase is then cooled to obtain the salt product.

Disclosed in various embodiments here are processes for producing a lithium beryllium fluoride salt, comprising: mixing ammonium beryllium fluoride with a lithium compound to form a reaction mixture; melting the reaction mixture to produce a molten phase; purging the molten phase; and cooling the molten phase to obtain the lithium beryllium fluoride salt.

The melting can occur at a temperature of from about 100° C. to about 1000° C., or from about 300° C. to about 1000° C., or from about 350° C. to about 1000° C.

The gases produced during the melting step can be withdrawn.

Sometimes, the lithium compound comprises an enriched lithium-6 compound and a natural lithium compound.

The purging may be performed with a combination of hydrogen and hydrogen fluoride gas.

Sometimes, a sodium salt is also included in the reaction mixture, and the resulting salt is a lithium sodium beryllium fluoride (FLiNaBe) salt.

Alternatively, a potassium salt can be included in the reaction mixture, and the resulting salt is a lithium potassium beryllium fluoride (FLiKBe) salt.

The molten phase may be poured into a mold prior to cooling.

The resulting lithium beryllium fluoride salt may contain from about 1 wt % to about 99 wt % of beryllium fluoride. In some embodiments, the molar ratio of lithium fluoride to beryllium fluoride in the lithium beryllium fluoride salt is at least 2:1.

These and other non-limiting characteristics are more particularly described below.

BRIEF DESCRIPTION OF THE DRAWINGS

The following is a brief description of the drawings, which are presented for the purposes of illustrating the exemplary embodiments disclosed herein and not for the purposes of limiting the same.

DETAILED DESCRIPTION

Figure 1:
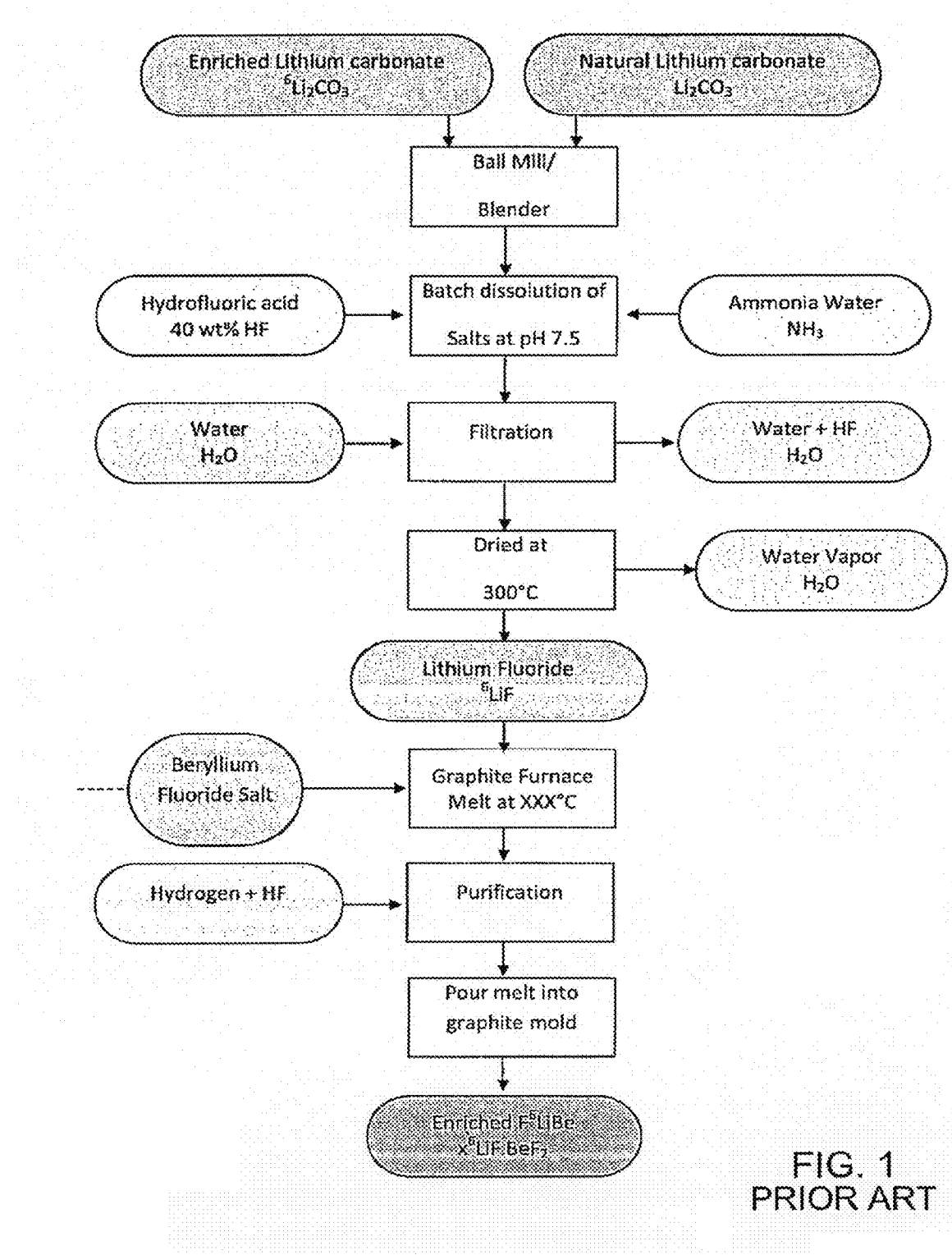
FIG. 1 is a process diagram showing a conventional method for producing FLiBe salts using lithium fluoride and beryllium fluoride.

A more complete understanding of the components, processes, and apparatuses disclosed herein can be obtained by reference to the accompanying drawings. These figures are merely schematic representations based on convenience and the ease of demonstrating the present disclosure, and are, therefore, not intended to indicate relative size and dimensions of the devices or components thereof and/or to define or limit the scope of the exemplary embodiments.

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

The singular forms "a," "an," and "the" include plural referents unless the context clearly dictates otherwise.

As used in the specification and in the claims, the term "comprising" may include the embodiments "consisting of" and "consisting essentially of."

Numerical values should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable (for example, the range of "from 2 grams to 10 grams" is inclusive of the endpoints, 2 grams and 10 grams, and all the intermediate values).

As used herein, approximating language may be applied to modify any quantitative representation that may vary without resulting in a change in the basic function to which it is related. Accordingly, a value modified by a term or terms, such as "about" and "substantially," may not be limited to the precise value specified. The modifier "about" should also be considered as disclosing the range defined by the absolute values of the two endpoints. For example, the expression "from about 2 to about 4" also discloses the range "from 2 to 4."

The processes of the present disclosure relate generally to the production of a lithium beryllium fluoride salt. Exemplary lithium beryllium fluoride salts include those of the formulas $Li_2BeF_4$ and $LiBeF_3$, which can be generalized as salts of the formula $nLiF$—$BeF_2$, where n is an integer. The term "lithium beryllium fluoride salt" should be construed as requiring the presence of lithium, beryllium, and fluorine at a minimum. Other salts which should be considered as falling within the scope of this term include lithium sodium beryllium fluoride (FLiNaBe, a ternary mixture of LiF, $BeF_2$, and NaF) and lithium potassium beryllium fluoride (FLiKBe, a ternary mixture of LiF, $BeF_2$, and KF).

The conventional method of producing a lithium beryllium fluoride salt requires the intermediate production of lithium fluoride, which is then mixed and melted with beryllium fluoride. Lithium fluoride can be made in different ways. For example, lithium carbonate and hydrofluoric acid can be converted to lithium fluoride. Alternatively, lithium carbonate can be mixed together with ammonium fluoride and heated to 400° C. for 4 hours to produce lithium fluoride. Finally, lithium carbonate can be reacted with ammonium bifluoride at high temperature to produce lithium fluoride. Byproducts of such a reaction could include ammonium carbonate, ammonium bicarbonate, and possibly ammonium fluoride.

A conventional method is illustrated in FIG. 1. Here, lithium carbonate is dissolved in ammonia water and reacted with hydrofluoric acid, then filtered and dried to obtain lithium fluoride. The lithium fluoride is then melted with beryllium fluoride, purified, and cooled to obtain the lithium beryllium fluoride salt. Seven steps (the square boxes) are needed to produce the final product from the starting ingredients.

Figure 2:
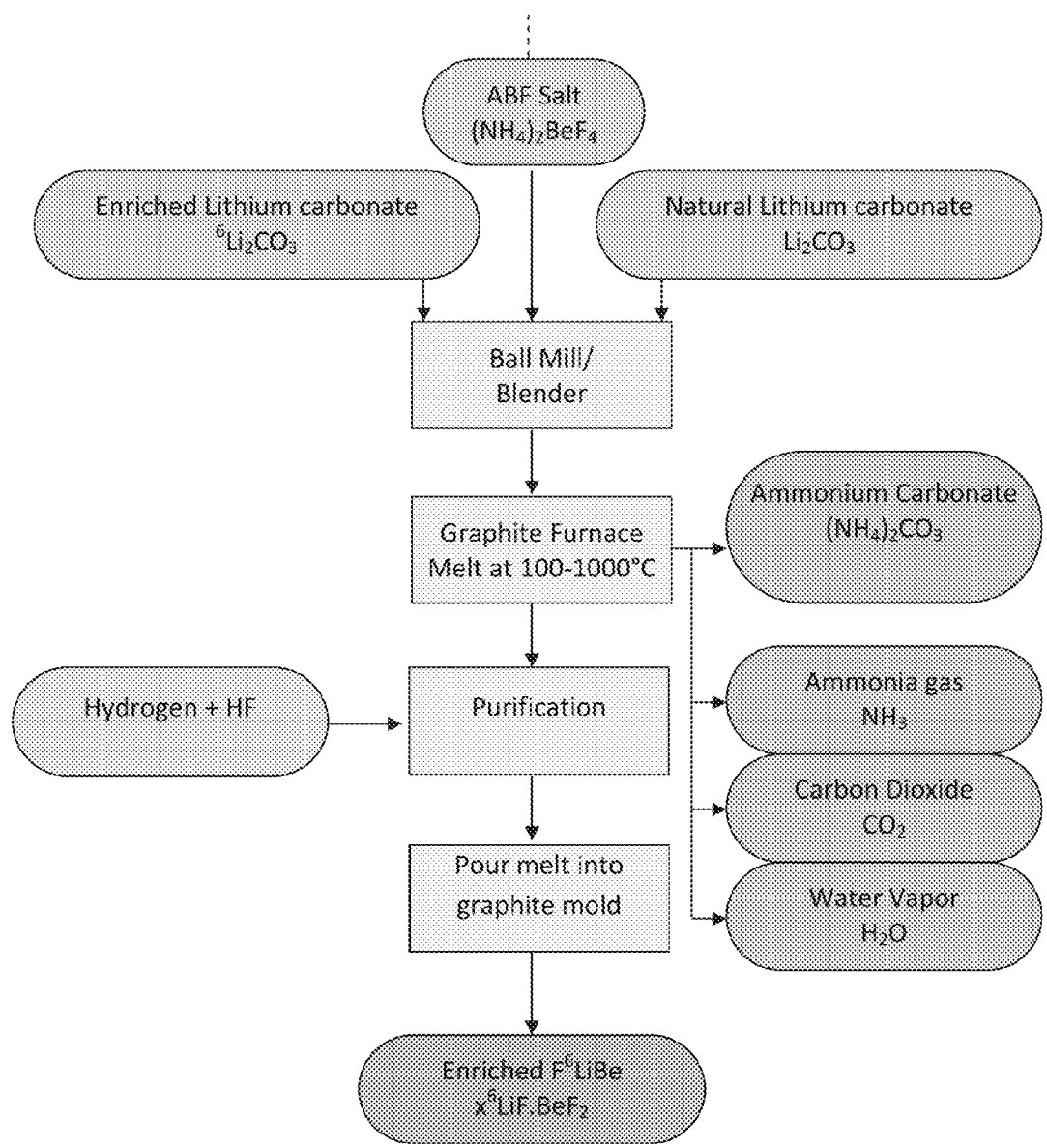
FIG. 2 is a process diagram illustrating the processes of the present disclosure, which use ammonium beryllium fluoride.

Generally, in the processes of the present disclosure, ammonium beryllium fluoride (ABF) is used as a beryllium source. ABF has the formula $(NH_4)_2BeF_4$. ABF is mixed with a lithium compound to form a reaction mixture. The reaction mixture is then heated to melt the compounds and produce a molten phase. The molten phase is purged to remove residual gases and byproducts, then cooled to obtain the final lithium beryllium fluoride salt. This is shown in FIG. 2. Two examples of the reaction of the present disclosure are provided below as Reactions (2) and (3):

$$(NH_4)_2BeF_4+2LiOH \rightarrow Li_2BeF_4+2NH_3(g)+2H_2O(g) \quad (2)$$

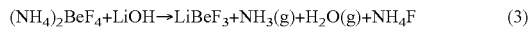
$$(NH_4)_2BeF_4+LiOH \rightarrow LiBeF_3+NH_3(g)+H_2O(g)+NH_4F \quad (3)$$

One advantage of the processes of the present disclosure is that they do not require the intermediate steps of producing lithium fluoride and beryllium fluoride separately prior to making the Li—Be—F salt. Comparing FIG. 1 and FIG. 2, the processes of the present disclosure need only four steps compared to the seven steps of conventional methods. Avoiding the need to produce beryllium fluoride reduces capital costs, production costs, and materials handling issues. In addition, the reactions have a negative Gibbs free energy ($\Delta G$) and are endothermic. Reaction (2) has a $\Delta G$ at 600° C. of −111 kcal/mol and a $\Delta H$ at 600° C. of +51.1 kcal/mol. Reaction (3) has a $\Delta G$ at 600° C. of −63.3 kcal/mol and a $\Delta H$ at 600° C. of +49.6 kcal/mol. It is also expected that the reactions will obtain near complete conversion of reactant to product. Included are appendices showing the thermodynamic values for the reactions over a range of temperatures.

Initially, the ammonium beryllium fluoride (ABF) salt is mixed with a lithium compound to form a reaction mixture. The lithium compound can be, for example, lithium hydroxide (LiOH) or lithium carbonate ($Li_2CO_3$). The compounds can be mixed together using known apparatuses, for example a ball mill or a blender. If it is desired to produce FLiNaBe or FLiKBe, an appropriate sodium or potassium compound can also be mixed in with the ABF and the lithium compound. Such compounds could include NaOH, KOH, $Na_2CO_3$, or $K_2CO_3$.

It is noted that naturally occurring lithium is composed of two isotopes: $^6Li$ and $^7Li$. The natural concentration of $^6Li$ is 7.5 wt % of the total lithium. To produce a desired level of enrichment (i.e. with a greater proportion of $^6Li$), a natural lithium compound and an enriched lithium-6 compound can be blended in a desired proportion in the reaction mixture to obtain the desired enrichment in the final Li—Be—F salt.

Next, the reaction mixture is melted to produce a molten phase. The reaction mixture can be melted, for example, using a graphite furnace. The melting generally occurs at a temperature from about 100° C. to about 1000° C., or in more specific embodiments from about 300° C. to about 1000° C. or from about 350° C. to about 1000° C. In this temperature range, the reaction is endothermic and has a negative Gibbs free energy.

During the melting of the reaction mixture, several byproducts can be formed. As seen in Reactions (2) and (3), these can include ammonium fluoride ($NH_4F$), ammonia ($NH_3$), water ($H_2O$), and/or hydrogen fluoride (HF). Gaseous byproducts can be withdrawn while the reaction mixture is melting, for example by use of vacuum.

The molten phase is then purged. A combination of hydrogen and hydrogen fluoride gas can be injected through the molten phase to remove residual moisture, carbon dioxide, and other entrapped gases.

The molten phase is then cooled to obtain the lithium beryllium fluoride salt. If desired, the molten phase can be poured into a mold and then cooled. The resulting salt is a combination of lithium fluoride and beryllium fluoride, and optionally other fluoride salts. In some particular embodiments, the molar ratio of lithium fluoride to beryllium fluoride is at least 1:1, or is at least 2:1.

Figure 3:
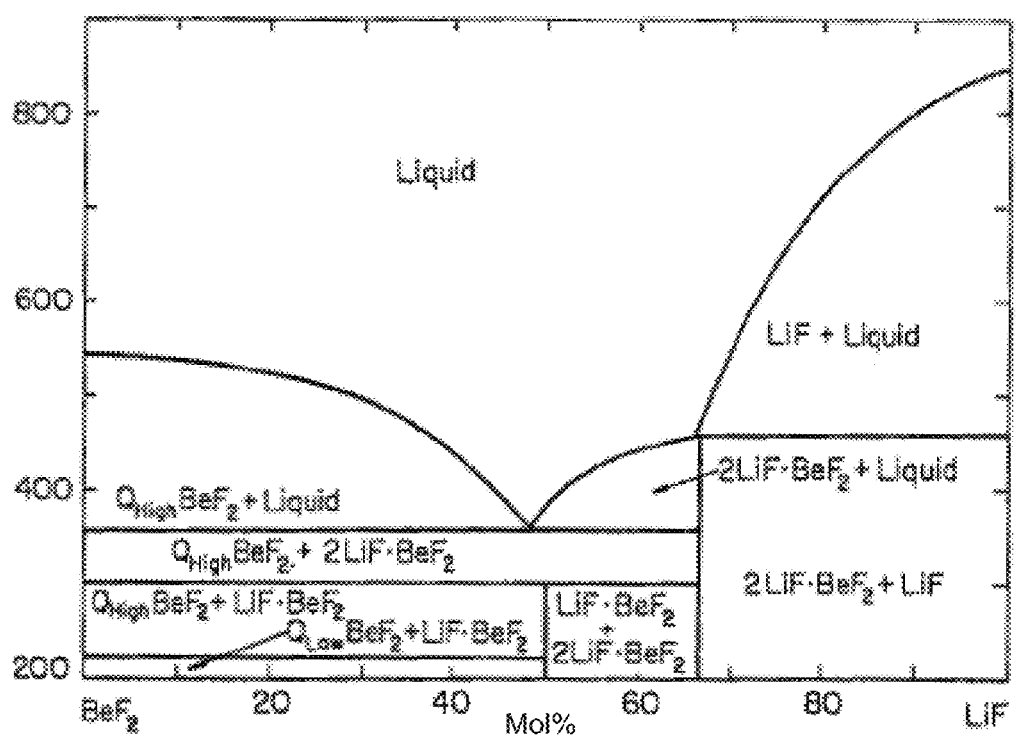
FIG. 3 is a phase diagram for a lithium fluoride-beryllium fluoride system.

The resulting lithium beryllium fluoride salt can range from about 1 wt % to about 99 wt % of the beryllium fluoride salt. In particular embodiments, the optimum composition is that which results in the lowest melting point of the molten salt system. In the case of FLiBe, a melting point below 400° C. can be achieved at approximately 50 mol % Beryllium fluoride. FIG. 3 shows the phase diagram for the beryllium fluoride-lithium fluoride system.

Again, the processes of the present disclosure avoid the preparation of beryllium fluoride as an intermediate. Rather, the reaction of ABF with the lithium compound results in formation of the beryllium fluoride. ABF salts are also far more stable than beryllium fluoride, and thus using ABF reduces any handling and storage challenges that might exist with beryllium fluoride.

One of the purest forms of beryllium compounds produced industrially is ammonium beryllium fluoride (ABF). Lithium can also be obtained in high purity, so the resulting purity of the lithium beryllium fluoride salt should also be very high.

The molten FLiBe phase could be used to produce beryllium metal as well. The molten FLiBe phase could be subjected to an applied electron current through electrodes, with beryllium metal flakes being formed at the cathode and $HF/F_2$ gas being generated at the anode.

The present disclosure has been described with reference to exemplary embodiments. Obviously, modifications and alterations will occur to others upon reading and understanding the preceding detailed description. It is intended that the present disclosure be construed as including all such modifications and alterations insofar as they come within the scope of the appended claims or the equivalents thereof.

The invention claimed is:

1. A process for producing a lithium beryllium fluoride salt, comprising:
   mixing ammonium beryllium fluoride with a lithium compound to form a reaction mixture;
   melting the reaction mixture to produce a molten phase;
   purging the molten phase; and
   cooling the molten phase to obtain the lithium beryllium fluoride salt;
   wherein the lithium compound is lithium hydroxide (LiOH) or lithium carbonate ($Li_2CO_3$).

2. The process of claim 1, wherein the melting occurs at a temperature of from about 100° C. to about 1000° C.

3. The process of claim 1, wherein the melting occurs at a temperature of from about 300° C. to about 1000° C.

4. The process of claim 1, wherein the melting occurs at a temperature of from about 350° C. to about 1000° C.

5. The process of claim 1, wherein gases produced during the melting are withdrawn.

6. The process of claim 1, wherein the lithium compound comprises an enriched lithium-6 compound and a natural lithium compound.

7. The process of claim 1, wherein the purging is performed with a combination of hydrogen and hydrogen fluoride gas.

8. The process of claim 1, wherein a sodium salt is also included in the reaction mixture, and the resulting salt is a lithium sodium beryllium fluoride (FLiNaBe) salt.

9. The process of claim 1, wherein a potassium salt is also included in the reaction mixture, and the resulting salt is a lithium potassium beryllium fluoride (FLiKBe) salt.

10. The process of claim 1, wherein the molten phase is poured into a mold prior to cooling.

11. The process of claim 1, wherein the lithium beryllium fluoride salt contains from about 1 wt % to about 99 wt % of beryllium fluoride.

12. The process of claim 1, wherein the molar ratio of lithium fluoride to beryllium fluoride in the lithium beryllium fluoride salt is at least 2:1.

\* \* \* \* \*